United States Patent [19]

Linder et al.

[11] Patent Number: 4,761,233

[45] Date of Patent: Aug. 2, 1988

[54] NOVEL MEMBRANES AND PROCESS FOR MAKING THEM

[75] Inventors: Charles Linder, Rehovot; Mordechay Perry, Petach Tikvah; Reuven Ketraro, Rishon LeZion, all of Israel

[73] Assignee: Membrane Products Kiryat Weizmann Ltd., Rehovot, Israel

[21] Appl. No.: 24,327

[22] Filed: Mar. 10, 1987

[30] Foreign Application Priority Data

Mar. 17, 1986 [IL] Israel .......................................... 78169

[51] Int. Cl.$^4$ ........................... C08J 9/28; B29C 39/10
[52] U.S. Cl. ............................ 210/500.37; 210/500.38; 210/500.40; 210/500.41; 264/41; 264/216; 264/331.19
[58] Field of Search ...................... 264/41, 216, 331.19; 210/500.38, 500.37, 500.40, 500.41

[56] References Cited

U.S. PATENT DOCUMENTS 4,595,503 6/1986 Schindler et al. .............. 210/500.38
4,605,526 8/1986 Reynhout et al. .................... 264/41

Primary Examiner—Philip Anderson
Attorney, Agent, or Firm—Helfgott & Karas

[57] ABSTRACT

A process for preparing a microporous membrane, which comprises casting the membrane from a solution comprising a mixture of at least one pore-forming polymer and at least one film-forming polymer, and a solvent for the mixture of polymers, wherein the at least one pore-forming polymer is one which if cast alone would contract to form either large pores or a non-uniform distribution of material.

32 Claims, 3 Drawing Sheets

NOVEL MEMBRANES AND PROCESS FOR MAKING THEM

FIELD OF THE INVENTION

The present invention relates to novel microporous membranes and a method for making them.

BACKGROUND OF THE INVENTION

Microporous membranes with pore size varying from 0.01 to 10 microns are known in the literature, but are generally easily fouled and/or relatively hydrophobic, or weak and hydrophilic, compacting at high pressures and difficult to produce with high porosity and/or well defined surface pores.

Prior art method of microporous membrane production are numerous. Some examples will be given in the description which follows.

(1) A solution of polymer is cast with subsequent solvent removal under carefully controlled conditions. Such removal must be carried out very slowly, which results in an expensive process of poor reproducibility, with a wide variation of pore size for a given membrane. Carefully controlled conditions of temperature, humidity and air circulation must be maintained.

(2) A well-defined narrow range of pore sizes may be obtained by a nuclear penetration and etching technique. The pore volume is very low however (less than 15%), in order to minimise degradation. In addition, many polymers are unsuitable for use in this process, because of poor etching characteristics.

(3) Ultraviolet and electron beams may be used to polymerize monomers into a three dimensional cross-linked microporous membrane (U.S. Pat. No. 4,466,931). The formation of pores occurs during the polymerization process, whereby the polymer precipitates from the solution of monomer. While this process may achieve rapid production rates, the membranes are isotropic and more easily fouled than asymmetric structures. In addition, filters of 1 to 10μ have not been reproducibly obtained, and there is a problem of leachable materials.

(4) A solution of a membrane forming polymer may be quenched in a polymer nonsolvent, e.g. water (Marinaccio et al U.S. Pat. No. 3,876,738 and Pall, EP No. 0 005 536). Many different materials such as cellulose derivatives, polyamides, polysulfones and polycarbonates have been used, and these membranes are generally characterized by asymmetric structures. Control of pore size is generally a function of careful formulation of the polymer solution, which is brought to the point of incipient precipitation and/or the use of a gelatin bath containing a high percentage of polymer solvent. Careful stirring, temperature and rates of quenching are mandatory for a uniform product. It is difficult, however, via this method to achieve uniform microfilters with pores sizes reliably in the range of 1 to 10μ. It is also a costly process to carry out, with a large expenditure for solvents.

(5) Sintering of particles of organic materials such as polyolefins (e.g. high density polyethylene), polytetrafluoroethylene, polyvinylidene fluoride, and inorganics such as alumina, silica, zirconia, graphite and other forms of carbon have produced useful microfilters. In the case of organic polymers, it has been difficult to achieve uniform and narrow pore size distribution and the membranes have been isotropic rather than asymmetric. Inorganic membranes have achieved asymmetry by sintering two or three layers of different particle sizes. These membranes foul relatively easily and are considerably more expensive than organic polymers.

(6) Microporous membranes have also been made by a microcracking process (Ind. Eng., Prod. Res. Develop., Vol. 13, No. 1, 1974). For example, deformation of annealed polypropylene parallel to the direction of extrusion and followed by high temperatures for stabilization of the elongated films, gives rectangular pores (for example 2000 A and 4000 A by 200 and 400 A, respectively). However, in order to maintain mechanical strength, these membranes do not have a high density of pores. In addition, these membranes are isotropic and demonstrate relatively low flux.

(7) Yet another popular technique is the phase separation of a polymer solution or dispersion. In effect, a polymer is brought into solution or dispersed at elevated temperature and then solidified by cooling and removing the liquid or solvent (U.S. Pat. No. 3,812,224). In one approach (Castro, U.S. Pat. No. 4,247,498) any synthetic thermoplastic polymer may be dissolved in a compatible liquid to form a solution. The plastic is then rendered microporous by cooling at a rate fast enough to prevent liquid-liquid phase separation. The cooling rate criteria must be carefully adjusted to form cellular microstructures of spherical shapes and pores or passageways interconnecting adjacent cells. The basic structure is relatively homogeneous and isotropic. Though this method results in highly porous membranes, the isotropic structure is susceptible to fouling and plugging, and compaction at elevated operating pressures.

Materials commonly used for making microfilters are polycarbonates, polyamides (nylon 6, nylon 6,6, nylon 610, nylon 13), polysulfones, cellulose derivatives (for example, cellulose, cellulose discetate, cellulose triacetate, cellulose nitrate), polyacrylonitrile and copolymers, polypropylene, polytetrafluoroethylene, alumina, silica, carbon, polyvinylidene fluoride, high and low density polyethylene, polypropylene, polystyrene, polyvinyl chloride, acrylonitrile-butadiene-styrene terpolymers, styrene-acrylonitrile and styrene-butadiene copolymers, polyvinylacetate, polyvinylidene chloride, ethylenevinylacetate copolymers, ethylene-acrylic copolymers, polymethylacrylates, and oxidation polymers such as polyphonylencoxide.

The present invention provides microporous membranes and a procedure for making them, which overcomes these shortcomings of the current state of art.

SUMMARY OF THE INVENTION

There is accordingly provided, in accordance with the present invention, a process for preparing a microporous membrane, which comprises casting the membrane from a solution comprising a mixture of at least one pore-forming polymer and at least one film-forming polymer, and a solvent for the mixture of polymers, wherein the at least one pore-forming polymer is one which if cast alone would contract to form either large pores or a non-uniform distribution of material.

The solution preferably comprises a water-miscible solvent and the membrane is gelled in water, or in an aqueous solution or mixture. Additionally, the solution may comprise a liquid which is non-solvent for the mixture of polymers, and/or a salt. The membrane may be cast onto a discrete support and may optionally be subsequently removed therefrom, or it may be extended, e.g. in the form of a hollow fiber or tubelet.

In a particular embodiment of the process of the invention, at least one polymer used in forming the membrane comprises reactive functions such as e.g. those selected from the group consisting of halogens, glycidyl, isocyanato, isothiocyanato, amino, hydroxyl and sulfhydryl, which are incorporated in the membrane structure. Subsequently to membrane formation, the reactive halogens, glycidyl, isocyanato or isothiocyanato, for example, are reacted with a momomeric or polymeric substance containing one or more reactive groups selected from reactive primary amino, secondary amino, tertiary amino, OH and SH groups. Such a substance may be, for example, a tertiary amine, in which case the reaction product will be a membrane containing quaternary ammonium groups. Alternatively, the substance may be at least one polymer containing —NH—, OH or SH groups, when the reaction product will be a cross-linked membrane; in this context, it is to be understood that in such —NH— groups, one free valency is attached to the at least one polymer, and the other free valency is attached to a hydrogen atom, a substituent group, or the at least one polymer. The substance containing one or more reactive groups may be synthetic or natural and may be biologically active or inactive. Where the substance is biologically active it may be monomeric, oligomeric or polymeric. As examples of biologically active substances, there may be mentioned enzymes, hormones, antigens and antibodies. If the membrane contains primary amino, secondary amino, tertiary amino, hydroxyl or sulfhydryl groups, then it may be reacted with monomers or polymers containing e.g. functions selected from the group consisting of reactive halogens, glycidyl, isocyanato and isothiocyanato. These monomers or polymers may also contain anionic or cationic groups, or ether groups. The resultant membrane may contain hydrophilic and/or anionic and/or cationic groups on its external and internal surfaces.

In another aspect, there is provided in accordance with the present invention the membrane per se, which is preparable by the above-described process of the invention. The membrane is composed of at least two different polymers, at least one of which is a film former, and at least another of which is a pore former which if cast alone would form large pores or a non-uniform distribution of material; and as to structure, the membrane comprises a microporous surface of well defined pore shapes, which surface is integrally and continuously connected to a pore support of the same material as the surface, in which pore support there exists a non-exact distribution of materials. It is moreover preferred that the pores occupy not less than about 10%, and preferably not less than about 50%, of the area of the microporous surface. The membrane may possess a structure which approximates to that of an array of sintered particles; the pores may be of relatively larger cross-sectional area on the microporous surface and taper to a relatively smaller cross-section towards the interior of the membrane.

In the membrane of the present invention, at least the majority of the pores may be characterized by one or more of the following characteristics, namely:

relatively larger cross-sectional area on the microporous surface and tapering to a relatively smaller cross-section towards the interior of the membrane; and/or a cross-sectional shape at said surface approximating to circles or ellipses, or to segments, cresents or annuli derived from such circles or ellipses; and/or diameters which lie within the range of from 0.01 to 20 microns, preferably from 0.01 to 10 microns.

The invention also extends to the membrane of the invention, mounted on a discrete support layer.

BRIEF DESCRIPTION OF THE DRAWINGS

The illustrations show scanning electron micrographs in which.

DETAILED DESCRIPTION OF THE INVENTION

Figure 1:
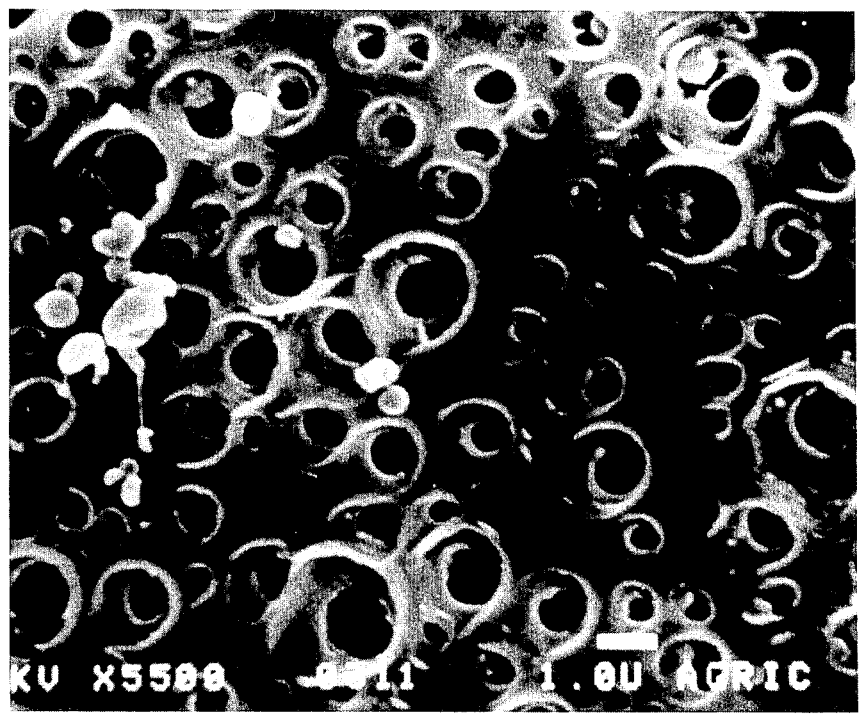
FIG. 1 depicts the top surface of a membrane in accordance with an embodiment of the invention, prepared from bromomethylated polyphenylene oxide and polysulfone.

The process of the invention involves the mixing of 2 types of polymer in a water miscible solvent(s); the polymer solvent solution is preferably cast on a support and immersed into an aqueous bath. The resulting membrane contains a majority of micropores which may vary between 0.01 and 10μ, as a function of the parameters described below. One essential component in the mixture is one or more hydrophobic pore-forming polymers. The suitability of this component to function as described herein is, that if cast alone, it will contract on the support to form large pores (greater than 1 micron in its largest dimension, preferably greater than 10 microns and most preferably greater than 50 microns), or it will give rise to a non-uniform distribution of material, portions of which are isolated on the support. The function of the other essential polymer component within the membrane, is to form a stronger film and to retain and control the pore extension properties of the pore-forming polymer.

Examples of such pore-forming polymers are halomethylated polyphenyleneoxide (for example, bromomethylated, 2,6 dimethyl polyphenylene oxide), brominated polyphenylene oxide, polystyrene derivatives, halomethylated polystyrene, nitropolystyrene, perfluoro polymers, silicone polymers (for example, polydimethylsiloxane, polymethyl ethylsiloxane), nitrated polyphenyleneoxide, nitrated polysulfones, polyisobutylenes, polyisoprenes, and halogenated polysulfones.

Examples of the film-forming polymers are addition, condensation and oxidation polymers such as polysulfones, sulfonated polysulfones, chloromethylated polysulfones, polyvinyl chloride, polyvinylidene chloride, polytetrafluoroethylene based copolymers, polychlorotrifluoroethylene, polyvinylidene fluoride and its copolymers, with hexafluoropropylene or chlorotrifluoroethylene, polyacrylonitrile (and copolymers of acrylonitrile with vinyl acetate, acrylic and methacrylic acid), nylon 6, nylon 6,6, polyether sulfones, polysulfones made with Bisphenol A, polyimideamides, polyamides, polyetherphenylketones, polyimides, polyepoxy compounds, polycarbonates and oxidation polymers, e.g. polyphenylene oxides.

Important parameters of casting are viscosity, as controlled by polymer concentration, polymer molecular weight, solvent, temperature and additives such as nonsolvents and salts. As a general rule, high viscosity solutions produce small pore sizes, as they decrease flow or movement of the pore-forming polymer. Viscosities in the range of 50 to 50,000 cps may be used, preferably 100 to 30,000 and most preferred 200 to 20,000 cps. The viscosity is a function of the molecular weight of the different polymers. For a given concentration and solvent high molecular weight polymers will give higher viscosities. The molecular weight may be chosen, so that the concentration of polymer(s) for achieving the desired viscosity ranges is not less than 5% nor more than 60% or preferably between 8 to 40% or most preferred, between 15 to 35% of material. The temperature of the casting solution may vary between −60° C. and 200° C., but is preferably within the range of between 0° and 100° C., more preferably between 4° and 90° C.

According to an embodiment of the invention, the polymers are dissolved in a solvent which is water miscible, and which dissolves the polymer components completely or partially. The solubility of the polymers may be a function of temperature, and temperatures for dissolution and for maintaining solubility may vary from −60° to 20° C., preferably between 0° to 95° C. The solution may be cast hot, or alternatively it may be cooled and then cast. Preferred solvents for the polymers are N-methypyrrolidone, pyrrolidone, pyrrolidine, dimethylsulfoxide, dimethylacetamide, and dimethylformamide.

These solvents may also contain nonsolvents such as e.g. acetone, ethanol, methanol, butanol, ethyl acetate, water, formamide and ethylene glycol and/or hydrophilic polymers and/or salts such as $LiHCO_3$, $LiCl$, $MgCl_2$, $MgClO_4$, $ZnCl_2$, $ZnBr_2$, $ZnI_2$ (and other materials well known within the state of the art). The salts and nonsolvents may be used to control viscosity and may effect pore size and distribution.

The solutions may be cast on a porous support material woven or nonwoven and left on the said material for additional strength, such as polyolefin nonwovens, polyester nonwoven, polyfluoro fabric, cellulosics, polyethylene, polypropylene, nylons, vinyl chloride homo- and co-polymers, polystyrene, polyesters such as polyethylene terephthalate, glass fibers, ceramics and porous metal.

Alternatively, the solutions may be cast as flat sheets and removed from the support or they may be cast as hollow fibers or tubelets without the need of support. When supported, the membrane may be in a tubular configuration or in a flat sheet plate and frame, or the flat sheet may be wound into a spiral wound configuration or formed into a pleated cartridge. The tubular configuration may be formed by winding a preformed flat sheet and sealing the overlap via heat, adhesives or ultrasound or it may be formed by casting into a continuously forming tube and gelling immediately, such that both tube casting and gelling are carried out in series and continuously. Simultaneously with the winding operation or subsequently, a further woven or nonwoven support layer may be wound so as to provide the tubular configuration with additional mechanical strength.

The cast solution once spread upon the support into the desired shape, may be exposed in an evaporation step of up to about 24 hours and then immersed in an aqueous bath containing only water or water with surfactants, and/or salts and/or polymer solvents and/or hydrophilic polymers. Examples of such water and aqueous combinations can be found in many of the patents cited herein, as well as in reference mentioned therein and in NL No. 8104496. It is one of the advantages of the present invention, that the membrane may be formed without high concentration of solvents in the aqueous gelling bath. However, such an approach embodying the use of solvents is not excluded.

In the use of such membranes the solution to be filtered should be filtered by crossflow or stationary application. In cross flow, the mixture, dispersion or solution is passed over the surface of the membrane and a pressure is applied. The flow over the membranes may vary from laminar to turbulent and the transmembrane pressure may be from 4 psi to 300 psi, preferably 5 to 250 psi and most preferably 10 to 50 psi. A back pressure may be applied continuously or periodically as required by configuration and application.

Microporous membranes may be used for filtration and/or clarification of liquids, mixtures, suspensions or dispersions. They may also be used as supports for biologically active molecules (e.g. enzymes). For filtration functions, the rejection of particles or suspended matter is a function of pore size and charge on the membrane and particle. Because of dielectric or electrostatic interactions, particles or organisms smaller than the steric pore size may be retained. Based on this mechanism, filters are available with charged groups, on the surface and within their pores (Knight et al, European Patent Application No. 0,050,864); charges are attached to the membrane by crosslinking a charged monomer or polymer to the membrane's internal and external surface. It is emphasized that this approach does not reduce flow through rate. In the present invention, charging may be carried out by a similar procedure, but alternatively if one of the polymers is reactive, e.g. if in the case of haloalkylated polyphenyleneoxides or polysulfones, then the halogen atom may be substituted with groups containing cationic, anionic or neutral hydrophilic functions. Examples of such groups are alkyl (1 to 8 carbons branched or linear, saturated and unsaturated) or aromatic radicals containing ionic groups, such as sulfate, sulfonic, carboxylic acids, ammonium groups, and also phosphonium and sulfonium groups, as well as primary, secondary and tertiary amines and hydroxyl groups. Ion exchange capacities of 0.05 to 5 eq./Kg. can be achieved. Particularly advantageous are quaternary ammonium and/or carboxyl and/or sulfonic groups, depending on the purpose for which the membrane is to be applied. The alkyl or aromatic radical may be bonded to the polymer by primary, secondary or tertiary or quaternary amine, ether (—O—), sulfhydryl (—S—), carbonyl (—CO—), sulfone (—$SO_2$—), carboxyl (—O—CO—), amido (—NH—CO—), and thiocarbamido (—NH—CS—). In addition the membrane may be modified by reacting the reactive polymer component with polymers from solutions into which it is immersed.

Preferably hydrophilic polymers are used to coat the microporous membrane substrate. The preferred polymers are polyfunctional oligomers or polymers which contain active hydrogen atoms bound to nitrogen, oxygen or sulfur atoms. The nitrogen atoms may be present as aliphatic (acyclic or cyclic), aromatic, or heterocyclic amino groups which can be primary, secondary or tertiary. Or alternatively, but less preferred, they may be polymers containing hydroxyl or thio functions. Examples of such polymers are polyethyleneimine (M.W. 150–1,000,000), which can be partially alkylated or otherwise modified, polyvinylamine (M.W.1000 to 2,000,000), polyvinyl alcohol (M.W. of 2,000 to 200,000) or partially esterified polyvinyl alcohol, polyvinyl-aniline, polybenzylamines, polyvinyl mercaptan, polymers of hydroxyalkyl and aminoalkyl acrylates or methacrylates e.g. 2-hydroxyethyl or 2-aminoethyl methacrtylates, polyvinylimidazoline, amine modified polyepihalohydrin (described in GB No. 1,558,807), polydiallylamine derivatives, polymers containing piperidine rings (described in GB No. 2,027,614), amino polysulfones, amino polyarylene oxides (e.g. aminomethylated polyphenylene oxide), polyamidepolyamine-epichlorohydrin condensation products, and hydrophilic amines containing polymers described in EP No. 8945, and the condensation products of dicyandiamide, amine salt (ammonium chloride) and formaldehyde (U.S. Pat. No. 3,290,310). The above polymers may be in part a copolymer or a polymer containing other monomeric units, block polymers or graft polymers. If they are copolymers, the other monomeric units may or may not contain ionic groups ($-SO_3$—COO, $-NR_3$).

Examples are copolymers of styrenesulfonate(sodium salt)/vinylaniline, 2-aminoethylmethacrylate/acrylic acid, vinylaniline/vinylbenzyltrimethylammoniumchloride or vinylamine/vinylsulfonate.

Preferred polymers are polyvinylalcohols, cellulose derivatives, polyvinylamines, polyvinylanilines, polypiperidines, polydiallylamine derivatives or amine modified polymers on the basis of epoxides or epihalogenohydrins as well as the copolymers exemplified above.

One especially preferred polymer comprises polyaliphatic (acyclic or cyclic) amines. Polyethyleneimine is an example of this group. The range of molecular weights may be between 150 to 2,000,000 but preferably between 1000 and 200,000 and most preferred between 10,000 and 70,000. Low molecular weight polymers or oligomers (150 to 1000) may be used, but the increase in solute rejection of the final membrane is not as great when higher molecular weight polymers are used.

In another preferred case, water soluble amphoteric or block mosaic polymers containing both cationic and anionic groups, together with a reactive function (for example, $NH_2$ or OH groups) for reaction with the polyfunctional cross-linking agents are useful for forming a mixed charge membrane. An example of such a coating polymer is poly(vinylamine-vinyl-sulfonate) or partially quaternized derivatives.

Water is the preferred solvent for the aforementioned molecules, though other solvents such as low molecular weight alcohols or ketones may be used alone or in combination with water. The range of polymer concentration may be from 0.1 to 80%, but preferably between 1 and 30%, and most preferred between 1.0 and 15%. Liquid polymers can be used without solvents that are as pure (100%) agents, too.

The concentration of polymer needed to achieve optimum rejection and flux characteristics is a function of polymer M.W. and molecular dimensions, membrane porosity and pore size, temperature, time of immersion, pH and subsequent washing steps. These factors (together with a rinse step after immersion) control the thickness of the polymer layer deposited on the membrane. The temperature of the polymer solution during membrane immersion may vary from 0° to 90° C. The optimum temperature is a function of absorption rates. The time of immersion may vary between 1 minute to 48 hours as a function of the temperature, pH, concentration and the M.W. dimensions and solution properties of the coating polymer. For example, at a pH of 8.0 and R.T. 10% polyethyleneimine in water coats a polysulfone membrane in 1 to 5 minutes, adequately for the practice of this invention. On the other hand, poly(aminostyrene) should be used for 1 hour in immersion to achieve optimum flux/rejection characteristics.

The thus coated membranes may be further modified chemically to alter the hydrophilic/hydrophobic balance, or to crosslink the coating by one or more of the many different procedures known in the technical literature. Examples of such procedures may be found in EP No. 0,050,864 and EP No. 0,114,286.

Figure 2:
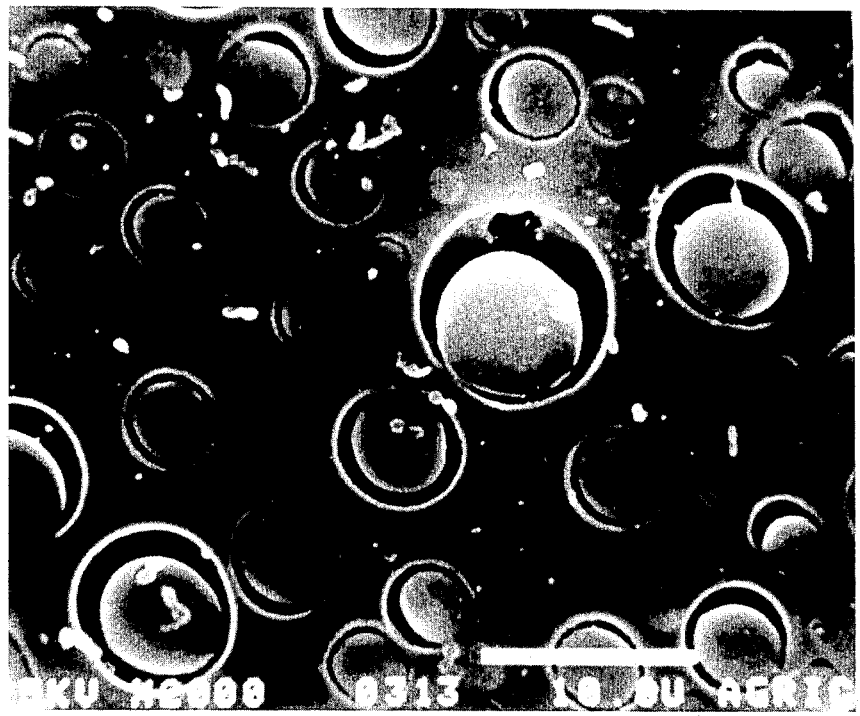
FIG. 2 depicts the top surface of a membrane in accordance with an embodiment of the invention, prepared from bromomethylated polyphenylene oxide and 95:5 acrylonitrile/vinyl acetate copolymer.
Figure 3:
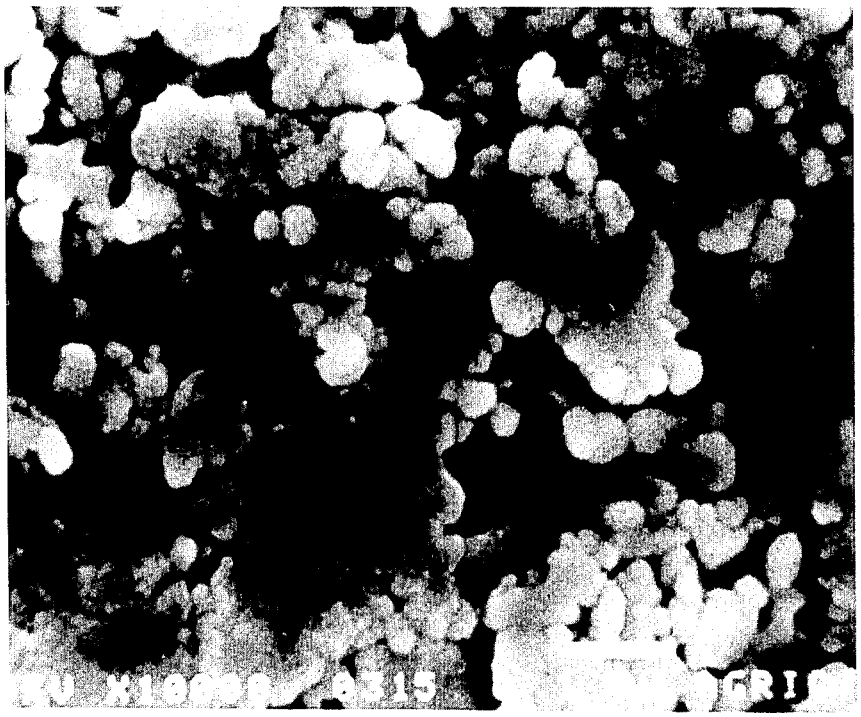
FIG. 3 depicts a cross-section of the integral support for the microporous surface of the membrane shown in FIG. 1.

Thus, according to the invention a membrane is provided with a microporous surface of well-defined pore shapes, which is integrally and continuously connected to a pore support of the same material. This support is shaped in a non-exact distribution of materials, but may be in the preferred case approach an array of sintered particles. The interchannel spaces (interstices) may be of the same size, or greater than the pore openings on the surface, but in the preferred case they would be smaller. The approach to a sintered particle arrangement enhances compaction stability, while the large pore on the surface allows for high flux. The shape of the pore opening may be spherical, elliptical, a concentric annulus, or may appear as different "moon phases". The exact shape is a function of the polymer components, molecular weight, temperature of the casting solution and gelling bath, relative humidity and evaporation time prior to immersion. For example, a 14.5% bromomethylated polyphenylene oxide with 10% polysulfone (in NMP solvent) upon gelling in water gives spherical shaped pores with ledges (FIG. 1), while the same bromomethylated polyphenylene oxide in 95:5 acrylonitrile-vinyl acetate copolymer gives annular-like concentric shaped openings (FIG. 2). It should be appreciated that by this approach, many different pore shapes can be achieved. A cross section of the bromomethylated polyphenyleneoxide and polysulfone shows that the integral support for the microporous structure has many irregular nodules, approaching a sintered particle configuration (FIG. 3).

ADVANTAGES OF THE INVENTION

The membranes in accordance with the present invention possess the following advantages:

(1) Well defined surface pore shapes, such as circles, ellipses, or half or quarter circular segments may be generated. This allows for optimal design of flux for a given application.

(2) The pores are larger on the surface and decrease in size to the bottom side of the membrane. This allows for higher fluxes, as it produces a mixing flow and allows for flow around trapped particles.

(3) Micropores through a range of pore sizes 0.01 to 20μ, preferably 0.1 to 10μ, may be produced.

(4) The membranes are modified easily to alter the hydrophobic/hydrophilic balance, or are readily charged either positively or negatively to increase hydrophobicity without reduction in flux. In addition, biologically active components may be crosslinked to prevent dissolution in organic solvents and to minimize compaction under high pressure.

(5) Biologically active membranes of this invention may be used as reactors, e.g. enzyme membrane reactors, or in chromatographic separation, or in affinity chromatography for removing specific biological species from complex mixtures.

These advantageous membrane properties are achieved in accordance with process of the present invention which is described herein. The invention will now be illustrated by the following Examples.

EXAMPLE 1

10 grams of 2,6-dimethyl phenylene oxide (MW~22,000) (PPO) is brominated in the methyl groups with 9 grams of N-bromosuccinimide to form a bromomethylated PPO of 1.4 eq. Br/Kg. A solution of N-methylpyrrolidone containing 14.5% of this PPO derivative and 10% of a polysulfone, made from Bisphenol A and dichlorodiphenyl sulfone (Udel TM 1700, Union Carbide), was cast (0.4 mn) on a polyester nonwoven from Kolff and immersed in a water bath at ambient conditions. After leaching for 24 hours the membrane was placed in a flat pressure cell with an overhead stirrer and gave a water flux of 18,640 $l./m.^2/hr.$, at 2 atm. pressure. A scanning electron micrograph of the top surface is given in FIG. 1.

EXAMPLE 2

Example 1 is repeated with 7.5% of the bromomethylated PPO instead of 14.5%. The flux is reduced to 4266, showing the importance of the proportion of PPO derivative in determining pore size and distribution, and thus flux, though this membrane is still included within the invention.

EXAMPLE 3

Example 1 is repeated, using 10% poly(acrylnitrile-vinylacetate) (95:5) instead of polysulfone. The flux of this membrane at 2 atm. was 1250 $l./m.^2/hr.$ A SEM of the surface (FIG. 2) reveals concentric sphere pores on the surface.

EXAMPLE 4

Example 1 is repeated, but instead of polysulfone, polyvinylidene fluoride (PVF2) (MW 70,000) is used. The PPO derivative and PVF2 are dissolved separately and then mixed to give the concentrations of Example 1. The cloudy solution is cast and gelled in a water bath. The resultant flux is 13,760 $l./m.^2/hr$ at 2 atm.

EXAMPLE 5

If Example 4 is repeated, but a sulfonated PPO derivative is used (1.2 meq. —$SO_3H$ groups/g.), the resulting membrane has a flux of 36 l./m2.hr. This demonstrates the importance of the chemical composition of the chosen polymer.

EXAMPLE 6

Example 1 is repeated, using chloromethylated(1.4 meq./g.)-polysulfone instead of polysulfone. The solution is heated to solubilize the polymers and then cast. The resulting water flux is 15,040 $l./m.^2/hr.$ If PPO is used instead of bromomethylated PPO, the flux is 5920 $l./m.^2/hr.$

EXAMPLE 7

Example 1 is repeated, using a Bisphenol A-epichlorohydrin condensate polymer (MW 20,000) instead of polysulfone. The resultant membrane had a water flux of 8000 $l./m.^2/hr.$

EXAMPLE 8

The membrane of Examples 1, 3 and 6 are immersed in a solution of 5% triethylamine and heated at 60° C. for two days. The resultant membranes had a cation exchange capacity of 1.6, 1.7, 2.3 meq. cationic group/g., respectively.

EXAMPLE 9

Example 8 was repeated, using in place of triethylamine, polyethyleneimine with an average molecular weight of 600 daltons. The resultant membranes had an amine content of 1,2, 1,0, and 2,2 meq./g., respectively, following removal of unbound polymer by washing for 24 hours. In addition, the resultant membranes were no longer soluble in N-methylpyrrolidone, dimethylformamide or dimethylsulfoxide.

EXAMPLE 10

In this Example, liquid poly(chlorotrifluoroethylene) (PCFE) is used as the pore forming polymer. A 5.0% solution of polysulfone used in the previous examples but with a molecular weight of 37,000, is prepared with 15% of PCFE and a membrane is prepared as in Example 1. The resultant flux is 8050 $l./m.^2/hr.$ If the concentration of polysulfone is increased to 15%, the flux in then 2000 $l./m.^2/hr.$

EXAMPLE 11

In this Example, polydimethylsiloxane liquid is used with the polysulfone used in Example 10. A casting solution of 25% polydimethylsiloxane and 5% polysulfone gives a membrane with a flux of 1750 $l./m.^2/hr.$

EXAMPLE 12

Example 1 is repeated using instead of polysulfone, cellulose acetate, MW 15,000, with an acetate content of 39.4%. The resultant membrane had a flux of 3400 $l./m.^2/hr.$ The membrane was subjected to pH 10 in aqueous medium for one week, to hydrolyze the acetate groups. The resultant membrane was hydrophilic and had a water flux of 7620 $l./m.^2/hr.$

EXAMPLE 13

Example 12 is repeated with polyvinyl acetate instead of cellulose acetate. The resultant membrane after hydrolysis had a flux of 2660 $l./m.^2/hr.$ The hydroxyl groups resulting from the hydrolysis of the acetate were subsequently reacted with 4-(4,6-dichloro-1,3,5-triazin-2-yl)aminobenzenesulfonic acid to give an anionic membrane.

EXAMPLE 14

To a membrane prepared as in Example 1, a 0.5M phosphate buffer solution (pH 7.0) containing 6 mg./ml. chymotrypsin and 7 mg./ml. phenyl propionate as inhibitor was applied with a 0.1 Atm. pressure difference. The membrane was washed thoroughly with water. It was then placed in a pressure cell and washed with water, $10^{-3}$ HCl (to break up the enzyme-inhibitor complex) and buffer, until no UV absorbance or enzymatic activity were detected in the washings. The membrane was then tested for enzymatic activity by driving through the membrane under various pressures, and at a temperature of about 26° C., 0.05M solutions of the following:

(a) N-benzoyl-L-tyrosine ethyl ester in 30% EtOH - 70% tris buffer at pH 7.8;

(b) N-acetyl-L-tryptophan methyl ester in tris buffer at pH 7.8, containing 0.05M $CaCl_2$; and (c) N-acetyl-DL-phenylalanine ethyl ester in tris buffer at pH 7.8, containing 0.05M $CaCl_2$.

In all cases, hydrolysis of the specified compounds was observed.

EXAMPLE 15

Example 1 is repeated, except that the PPO is nitrated with concentrated nitric acid, instead of being bromomethylated. The resultant membrane had a water flux of 5600 l./m.$^2$/hr.

While the invention has been particularly described with respect to certain illustrative embodiments, it will be apparent to those skilled in the art that many modifications and variations may be made. The invention is therefore not to be construed as limited by such embodiments, rather its scope will be defined only by the claims which follow.

We claim:

1. A membrane which is composed of at least two different polymers, at least one of which is a film former, and at least another of which is a water insoluble pore former which if cast alone would form large pores or a non-uniform distribution of material; said membrane comprising a microporous surface of well defined pore shapes, which surface is integrally and continuously connected to a pore support of the same material as said surface, in which pore support there exists a non-exact distribution of materials.

2. A membrane according to claim 1, wherein at least the majority of the pores are characterized by at least one of following characteristics (i), (ii) and (iii), namely:
   (i) relatively larger cross-sectional area on the microporous surface and tapering to a relatively smaller cross-section towards the interior of the membrane;
   (ii) a cross-sectional shape at said surface approximating to circles or ellipses, or to segments, crescents or annuli derived from such circles or ellipses:
   (iii) diameters which lie within the range of from 0.01 to 20 microns, preferably from 0.01 to 10 microns.

3. A membrane according to claim 2, wherein said pores occupy not less than about 10% of the area of said microporous surface.

4. A membrane according to claim 3, wherein said pores occupy not less than about 50% of the area of said surface.

5. A membrane according to claim 1, and mounted upon a discrete support layer.

6. A membrane according to claim 1, which contains at least one member selected from the group consisting of anionic groups, cationic groups and neutral hydrophilic groups, on its external and internal surfaces.

7. A membrane according to claim 1, which contains at least one member selected from the group consisting of polymeric anionic groups, polymeric cationic groups and polymeric neutral hydrophilic groups, on its external and internal surfaces.

8. A membrane according to claim 1, wherein at least one polymeric constituent of the membrane contains chemically incorporated therein a monomeric, oligomeric or polymeric biologically active material.

9. A membrane which has a structure which approximates to that of an array of sintered particles, and which is composed of at least two different polymers, at least one of which is a film former, and at least another of which is a water insoluble pore former which if cast alone would form large pores or a non-uniform distribution of material; said membrane comprising a microporous surface of well defined pore shapes, which surface is integrally and continuously connected to a pore support of the same material as said surface, in which pore support there exists a non-exact distribution of materials.

10. A membrane according to claim 1, which has been prepared by a process which comprises casting the membrane from a solution comprising a mixture of at least one pore-forming polymer and at least one film-forming polymer, and a solvent for the mixture of polymers, wherein the at least one pore-forming polymer is one which if cast alone would contract to form either large pores or a non-uniform distribution of material.

11. A membrane according to claim 8, which has been prepared by a process which comprises the steps of:
   casting the membrane from a solution comprising a mixture of at least one pore-forming polymer and at least one film-forming polymer, and a solvent for the mixture of polymers, wherein the at least one pore-forming polymer is one which if cast alone would contract to form either large pores or a non-uniform distribution of material, and wherein at least one polymer used in forming the membrane comprises reactive functions; and
   replacing the reactive functions by reaction with a substance containing one or more reactive members selected from the group consisting of primary amino, secondary amino, tertiary amino, OH and SH, and said substance being one which is selected from the group consisting of monomeric, oligomeric and polymeric biologically active materials.

12. A process for preparing a microporous membrane which comprises casting the membrane from a solution comprising a mixture of at least one water insoluble pore-forming polymer and at least one film-forming polymer, and a solvent for the mixture of polymers, wherein the at least one pore-forming polymer is one which if cast alone would contract to form either large pores or a non-uniform distribution of material.

13. Process according to claim 12, wherein the solution comprises a water-miscible solvent and the membrane is cast in water, or in an aqueous solution or mixture.

14. Process according to claim 12, wherein the solution comprises additionally a liquid which is a non-solvent for the mixture of polymers.

15. Process according to claim 12, wherein the solution comprises additionally at least one hydrophilic polymer.

16. Process according to claim 12, wherein at least one polymer used in forming the membrane comprises reactive functions, such as those selected from the group consisting of reactive halogens, glycidyl, isocyanato and isothiocyanato, which are incorporated in the membrane structure, and are replaceable by cationic, anionic or hydrophilic neutral groups.

17. Process according to claim 16, wherein the reactive functions are reactive halogens in the form of haloalkyl groups.

18. Process according to claims 17, wherein subsequently to membrane formation, the reactive functions are replaced by reaction with a monomeric or polymeric substance containing one or more reactive members selected from the group consisting of primary amino, secondary amino, tertiary amino, OH and SH.

19. Process according to claim 18, wherein the said substance is a tertiary amine, and the reaction product is a membrane containing quaternary ammonium groups.

20. Process according to claim 18, wherein the said substance is a at least one polymer containing —NH— groups, and the reaction product is a cross-linked membrane, and wherein in said —NH— groups one free valence is attached to said at least one polymer, and the other free valence is attached to a member selected from the group consisting of a hydrogen atom, a substituent group and said at least one polymer.

21. Process according to claim 18, wherein said substance is selected from the group consisting of monomeric, oligomeric and polymeric biologically active materials.

22. Process according to claim 12, wherein the membrane is cast without the use of a support.

23. Process according to claim 12, wherein the membrane is cast onto a discrete support.

24. Process according to claim 23, wherein said discrete support in selected from the group consisting of woven and nonwoven polyesters, polyolefins, poly(fluorinated alkenes), cellulosics, nylons, vinyl chloride homo- and co-polymers, polystyrene, glass fibers, ceramics and porous metals.

25. Process according to claim 24, wherein the membrane is subsequently removed from said discrete support.

26. Process according to claim 12, wherein the polymer starting materials satisfy at least one of the conditions (a) and (b), namely:
(a) the pore-forming polymer is selected from the group consisting of halomethylated polyphenyleneoxide, brominated polyphenyleneoxide, polystyrene derivatives, nitropolystyrene, perfluoro polymers, silicone polymers, nitrated polyphenyleneoxide, nitrated polysulfones, polyisobutylenos, polyisoprenes, and halogenated polysulfones; and
(b) the film-forming polymer is selected from the group consisting of polysulfones, sulfonated polysulfones, chloromethylated polysulfones, polytetrafluoroethylene-based copolymers, polychlorotrifluoroethylene, vinylidene fluoride homopolymer, vinylidene fluoride copolymers with hexafluoropropylene or chlorotrifluoroethylene, polyacrylonitrile, copolymers of acrylonitrile with vinyl acetate or with acrylic or methacrylic acid, nylon 6, nylon 6,6, polyether sulfones, polysulfones made with Bisphenol A, polyimideamides, polyamides, polyetherphenylketones, polyimides, polyepoxy compounds, polycarbonates and oxidation polymers.

27. Process according to claim 12, wherein the polymer starting materials satisfy at least one of the conditions (a) and (b), namely:
(a) the pore-forming polymer is selected from the group consisting of halomethylated polyphenyleneoxide, brominated polyphenyleneoxide, polystyrene derivatives, halomethylated polystyrene, nitropolystyrene, perfluoro polymers, silicone polymers, nitrated polyphenyleneoxide, nitrated polysulfones, polyisobutylenes, polyisoprenes, and halogenated polysulfones; and
(b) the film-forming polymer is selected from the group consisting of polysulfones, sulfonated polysulfones, chloromethylated polysulfones, polyvinyl chloride, polyvinylidene chloride, polytetrafluoroethylene-based copolymers, polychlorotrifluoroethylene, vinylidene fluoride homopolymer, vinylidene fluoride copolymers with hexafluoropropylene or chlorotrifluoroethylene, cellulosic esters and ethers, polyacrylonitrile, copolymers of acrylonitrile with vinyl acetate or with acrylic or methacrylic acid, nylon 6, nylon 6,6, polyether sulfones, polysulfones made with Bisphenol A, polyimideamides, polyamides, polyetherphenylketones, polyimides, polyepoxy compounds, polycarbonates and oxidation polymers.

28. Process according to claim 12, wherein the solvent for the polymers is selected from the group consisting of N-methypyrrolidone, pyrrolidone, dimethylsulfoxide, dimethylacetamide, and dimethylformamide.

29. Process according to claim 13, wherein said nonsolvent is selected from the group consisting of acetone, ethanol, methanol, butanol, ethyl acetate, wnter, formamide and ethylene glycol.

30. Process according to claim 12, wherein the solution comprises additionally at least one salt.

31. Process according to claim 30, wherein said salt is selected from the group consisting of $LiHCO_3$, $LiCl$, $MgCl_2$, $MgClO_4$, $ZnCl_2$, $ZnBr_2$ and $ZnI_2$.

32. Process according to claim 12, wherein the membrane is formed into a tubular configuration.

* * * * *